(12) United States Patent
Chen et al.

(10) Patent No.: US 8,179,264 B2
(45) Date of Patent: May 15, 2012

(54) RADIO FREQUENCY IDENTIFICATION TAG DEVICE FOR METALLIC PRODUCTS

(75) Inventors: Sung-Lin Chen, Kaohsiung (TW); Shih-Kang Kuo, Kaohsiung (TW); Ken-Huang Lin, Kaohsiung (TW)

(73) Assignee: China Steel Corporation, Kaohsiung (TW)

( * ) Notice: Subject to any disclaimer, the term of this patent is extended or adjusted under 35 U.S.C. 154(b) by 388 days.

(21) Appl. No.: 12/230,574

(22) Filed: Sep. 2, 2008

(65) Prior Publication Data

US 2009/0109034 A1 Apr. 30, 2009

(30) Foreign Application Priority Data

Oct. 29, 2007 (TW) .............................. 96140560 A

(51) Int. Cl.
*G08B 13/14* (2006.01)
*G01V 3/00* (2006.01)
*H04Q 5/22* (2006.01)
*G06K 7/06* (2006.01)
*H05K 1/03* (2006.01)

(52) U.S. Cl. .................. 340/572.7; 340/855.7; 340/653; 340/10.1; 343/860; 235/441; 174/255

(58) Field of Classification Search ............... 340/572.1, 340/10.1, 539.11; 343/895, 700, 860; 235/441; 174/255; 423/331
See application file for complete search history.

(56) References Cited

U.S. PATENT DOCUMENTS

| | | | |
|---|---|---|---|
| 4,559,015 A * | 12/1985 | Felesky | 434/61 |
| 6,476,775 B1 * | 11/2002 | Oberle | 343/895 |
| 2007/0008238 A1 * | 1/2007 | Liu et al. | 343/895 |
| 2007/0146135 A1 * | 6/2007 | Boyadjieff et al. | 340/572.1 |
| 2007/0256291 A1 * | 11/2007 | Credelle et al. | 29/600 |
| 2008/0052904 A1 * | 3/2008 | Schneider et al. | 29/846 |
| 2008/0089039 A1 * | 4/2008 | Gregory | 361/749 |
| 2008/0272977 A1 * | 11/2008 | Gaucher et al. | 343/860 |
| 2009/0271973 A1 * | 11/2009 | Credelle et al. | 29/600 |

FOREIGN PATENT DOCUMENTS

| | | |
|---|---|---|
| EP | 1 818 861 | 12/2009 |
| EP | 2 056 239 B1 | 4/2011 |
| GB | 2 428 939 A | 2/2007 |

OTHER PUBLICATIONS

Communication including the Extended European Search Report, mailed Feb. 13, 2009, for European Patent Application No. 08163243.2.

* cited by examiner

*Primary Examiner* — Toan N Pham
*Assistant Examiner* — Fekadeselassie Girma
(74) *Attorney, Agent, or Firm* — Finnegan, Henderson, Farabow, Garrett & Dunner, L.L.P.

(57) ABSTRACT

A radio frequency identification tag device includes an antenna unit including a dielectric substrate that has two through holes extending from a first surface to a second surface opposite to the first surface, a first conductive layer disposed over the first surface of the dielectric substrate, a second conductive layer unit disposed over the second surface of the dielectric substrate and having opposite second conductive layers spaced apart from each other such that a spacer is formed between the second conductive layers, and two connecting conductors each disposed in a corresponding through hole in the dielectric substrate and interconnecting electrically a corresponding second conductive layer and the first conductive layer. A radio frequency identification module is disposed to span the spacer and is attached to the second conductive layer unit.

5 Claims, 2 Drawing Sheets

RADIO FREQUENCY IDENTIFICATION TAG DEVICE FOR METALLIC PRODUCTS

CROSS-REFERENCE TO RELATED APPLICATION

This application claims priority of Taiwanese Application No. 096140560, filed on Oct. 29, 2007.

BACKGROUND OF THE INVENTION

1. Field of the Invention

The invention relates to a radio frequency identification tag device, more particularly to a radio frequency identification tag device for metallic products.

2. Description of the Related Art

Generally, a radio frequency identification (RFID) system includes an RFID tag device, serving as a transponder, adapted to be installed on a product, a RFID reader, serving as an interrogator, communicating with the RFID tag device in a wireless manner, and a system main unit, such as a host computer, coupled to the RFID reader.

In actual use, a conventional RFID tag device for metallic products is expensive, and has a relatively large size. On the other hand, although a conventional RFID tag device for non-metallic products is cheaper than that for metallic products, an effective communication distance between the conventional RFID tag device and the RFID reader is relatively short. If the conventional RFID tag device for non-metallic products is attached to a metallic product to reduce costs, a read request signal radiated by the RFID reader is easily reflected by the metallic product as a result of the image current effect. As a result, the conventional RFID tag device for non-metallic products cannot be directly attached to a metallic product.

SUMMARY OF THE INVENTION

Therefore, the object of the present invention is to provide a radio frequency identification tag device that is suitable for metallic products and that can overcome the aforesaid drawbacks of the prior art.

According to the present invention, a radio frequency identification tag device comprises:

an antenna unit including
  a dielectric substrate that has opposite first and second surfaces, and two through holes that extend from the first surface to the second surface,
  a first conductive layer disposed over the first surface of the dielectric substrate,
  a second conductive layer unit disposed over the second surface of the dielectric substrate and having opposite second conductive layers spaced apart from each other such that a spacer is formed between the second conductive layers, and
  two connecting conductors each disposed in a corresponding one of the through holes in the dielectric substrate and interconnecting electrically a corresponding one of the second conductive layers of the second conductive layer unit and the first conductive layer; and
a radio frequency identification module disposed to span the spacer in the second conductive layer unit and attached to the second conductive layers of the second conductive layer unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
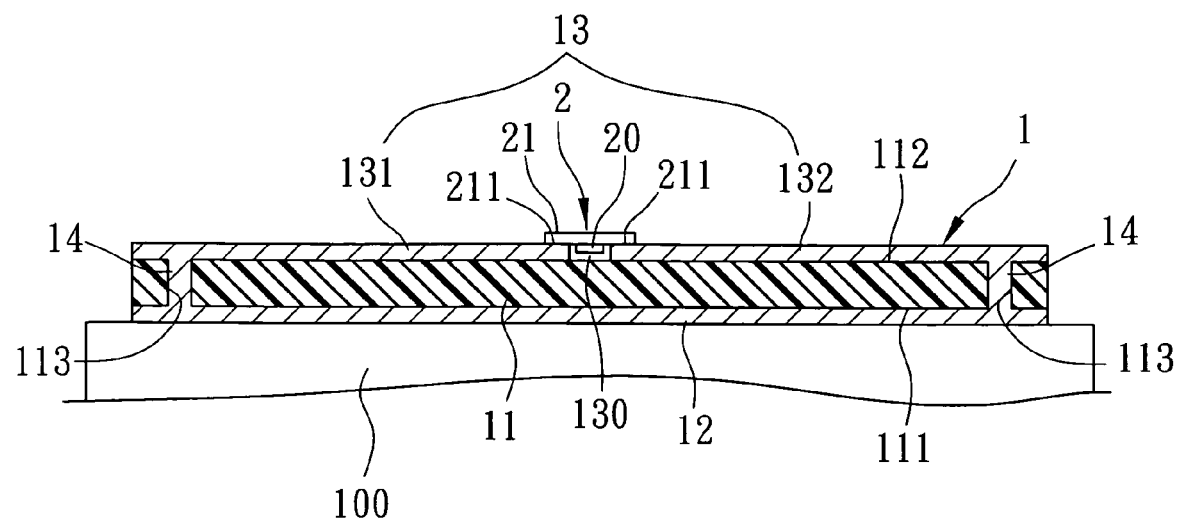
FIG. 1 is a schematic sectional view showing the first preferred embodiment of an RFID tag device according to the present invention.

Before the present invention is described in greater detail, it should be noted that like elements are denoted by the same reference numerals throughout the disclosure.

Figure 2:
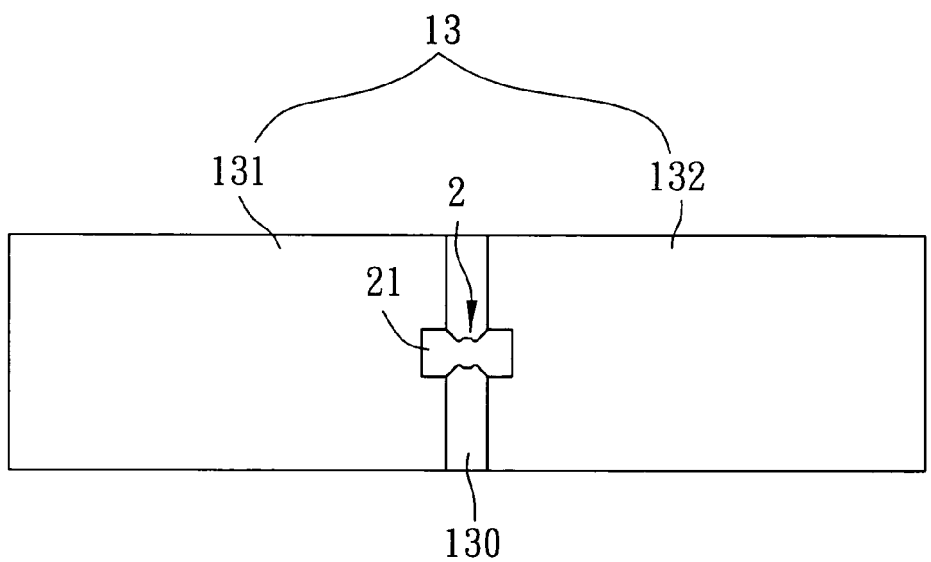
FIG. 2 is a schematic top view showing the first preferred embodiment.

Referring to FIGS. 1 and 2, the first preferred embodiment of an RFID tag device according to the present invention is shown to include an antenna unit 1, and an RFID module 2. The RFID tag device is adapted to be installed on a metallic product 100.

The antenna unit 1 includes a dielectric substrate 11, a first conductive layer 12, a second conductive layer unit 13, and two connecting conductors 14. The dielectric substrate 11 is a glass substrate, such as an FR4 substrate having the dielectric constant of 4.4. The dielectric substrate 11 has opposite first and second surfaces 111, 112, and two through holes 113 that extend from the first surface 111 to the second surface 112. The first conductive layer 12 is disposed over the first surface 111 of the dielectric substrate 11. The second conductive layer unit 13 is disposed over the second surface 112 of the dielectric substrate 11, and has opposite second conductive layers 131, 132 spaced apart from each other such that a spacer 130 is formed between the second conductive layers 131, 132. In this embodiment, each of the first conductive layer 12 and the second conductive layers 131, 132 of the second conductive layer unit 13 is made of copper foil. In other embodiments, the first conductive layer 12 and the second conductive layers 131, 132 of the second conductive layer unit 13 can be made of aluminum foil. Each connecting conductor 14 is disposed in a corresponding one of the through holes 113 in the dielectric substrate 11, and interconnects electrically a corresponding one of the second conductive layers 131, 132 of the second conductive layer unit 13 and the first conductive layer 12. In this embodiment, each connecting conductor 14 is made of copper.

The RFID module 2 is disposed to span the spacer 130, and is attached to the second conductive layers 131, 132 of the second conductive layer unit 13. In this embodiment, the RFID module 2 includes an RFID chip 20, and two contacts 211 each interconnecting electrically the RFID chip 20 and a corresponding one of the second conductive layers 131, 132 of the second conductive layer unit 13. It is noted that, in this embodiment, the RFID module 2 is in the form of an RFID strap, wherein the RFID chip 20 is attached adhesively to a strap 21 having two strap leads that serve as the contacts 211 and that are attached adhesively and respectively to the second conductive layers 131, 132 of the second conductive layer unit 13, as shown in FIG. 1.

In order to obtain an optimum communication distance between the RFID tag device and a tag reader (not shown), the complex conjugate match between impedances of the RFID module 2 and the antenna unit 1 is required. As a result, the RFID tag device of this invention can be designed to have a size of 16.5 mm×64 mm×0.8 mm. In an experiment, an effective communication distance between such an RFID tag device and the tag reader can reach 1.2~1.5 meters. Therefore, the RFID tag device of this invention is smaller and lighter, and can be fabricated at a lower cost.

Figure 3:
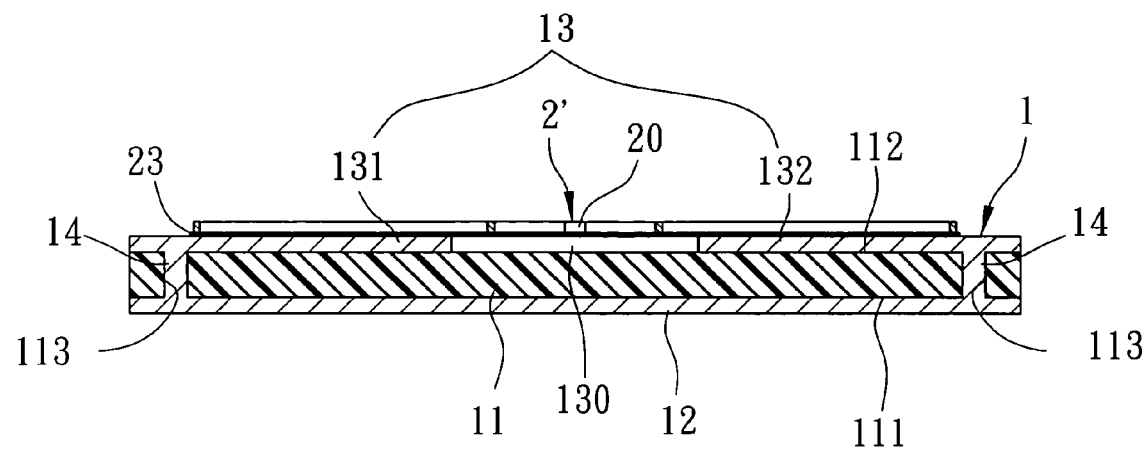
FIG. 3 is a schematic sectional view showing the second preferred embodiment of an RFID tag device according to the present invention.
Figure 4:
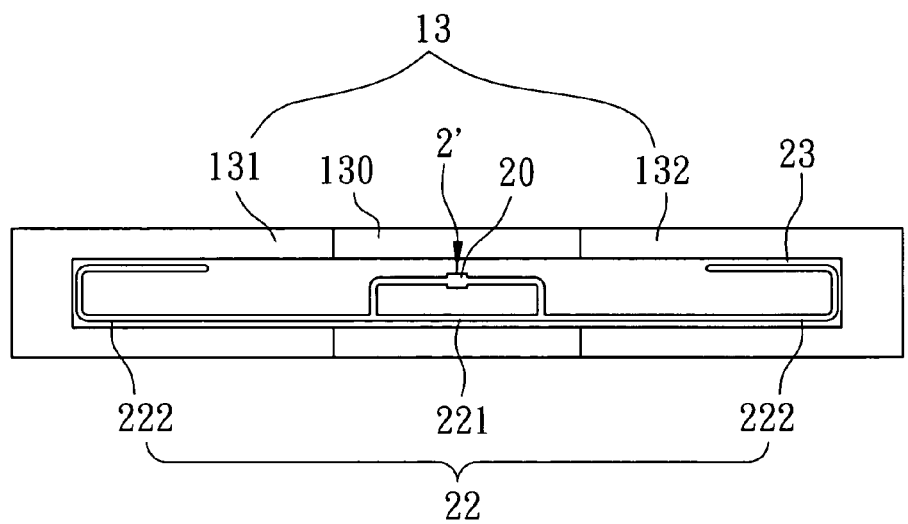
FIG. 4 is a schematic top view showing the second preferred embodiment.

FIGS. 3 and 4 illustrate the second preferred embodiment of an RFID tag device according to this invention, which is a modification of the first preferred embodiment.

In this embodiment, the RFID module 2' includes the RFID chip 20, an antenna element 22 having a central portion 221 that is coupled to the RFID chip 20, and opposite end portions 222 that are coupled integrally and respectively to opposite ends of the central portion 221, and a double-side adhesive tape 23 adhered with the RFID chip 20 and the antenna element 22 thereon and attached adhesively to the second conductive layer unit 13 so that the double-side adhesive tape 23 is disposed between the antenna element 22 and the second conductive layer unit 13 and that the end portions 222 of the antenna element 22 are disposed respectively on the second conductive layers 131, 132 of the second conductive layer unit 13.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A radio frequency identification tag device comprising:
    an antenna unit including:
        a rectangular dielectric substrate that has opposite first and second surfaces, and two opposite through holes that extend from said first surface to said second surface,
        a first conductive layer fully covering said first surface of said dielectric substrate,
        a second conductive layer formed over said second surface of said dielectric substrate, and patterned to form two opposite rectangular conductive patterns having the same size, said conductive patterns covering respectively said through holes in said dielectric substrate, and being spaced apart from each other to form a rectangular spacer therebetween, and
        two connecting conductors each disposed in a corresponding one of said through holes in said dielectric substrate and interconnecting electrically a corresponding one of said conductive patterns of said second conductive layer, and said first conductive layer such that said connecting conductors cooperate with said first conductive layer and said conductive patterns of said second conductive layer to constitute a radiator of said antenna unit; and
    a radio frequency identification module disposed to span said spacer in said second conductive layer and attached to said conductive patterns of said second conductive layer.

2. The radio frequency identification tag device as claimed in claim 1, wherein each of said first conductive layer and said second conductive layer is made of copper foil.

3. The radio frequency identification tag device as claimed in claim 1, wherein said connecting conductors are made of copper.

4. The radio frequency identification tag device as claimed in claim 1, wherein said radio frequency identification module includes a radio frequency identification chip, and two contacts each interconnecting electrically said radio frequency identification chip and a corresponding one of said conductive patterns of said second conductive layer.

5. The radio frequency identification tag device as claimed in claim 1, wherein said radio frequency identification module includes:
    a radio frequency identification chip;
    an antenna element having a central portion that is coupled to said radio frequency identification chip, and opposite end portions that are coupled integrally and respectively to opposite ends of said central portion; and
    a double-side adhesive tape adhered with said radio frequency identification chip and said antenna element thereon and attached adhesively to said second conductive layer so that said double-side adhesive tape is disposed between said antenna element and said second conductive layer and that said end portions of said antenna element are disposed respectively on said conductive patterns of said second conductive layer.

* * * * *